2,785,953

United States Patent Office

Patented Mar. 19, 1957

2,785,953

PROCESS FOR PREPARING A DRY MIXTURE OF AMMONIUM FLUOSILICATE AND SILICA

Frederick T. Fitch, Baltimore, Md., assignor to W. R. Grace & Co., New York, N. Y., a corporation of Connecticut No Drawing. Application August 4, 1954,
Serial No. 447,905

8 Claims. (Cl. 23—88)

This invention relates to a processs for the preparation of ammonium fluosilicate and silica. In one aspect, it relates to the preparation of dry ammonium fluosilicate and silica from silicon tetrafluoride. In another aspect, it relates to a process for the vapor phase elimination of toxic fluorine-containing constituents of the off-gases of commercial mineral acidulation processes, e. g., the phosphate rock acidulation process, and recovery of the gaseous fluorine values as dry, finely divided ammonium fluosilicate.

Many naturally occurring materials contain small quantities of silica and fluorine chemically associated with other elements or with themselves. On acid treatment of these materials, much of the fluorine is liberated as silicon tetrafluoride. An example of this is the acidulation of phosphate rock to form superphosphate or phosphoric acid. This mineral contains about 3–4 percent of chemically combined fluorine, at least 20–40 percent of which is evolved in the sulfuric acid acidulation of the rock. The off-gas stream contains air, water vapor, carbon dioxide, small quantities of other volatile constituents of the rock and about ½–2 percent by volume of silicon tetrafluoride. These off-gases from the superphosphate and phosphoric acid processes represent the cheapest known source of silicon tetrafluoride. However, separation of silicon tetrafluoride in a pure form from the gas stream is technically and economically impractical.

The fluorine values are presently recovered by scrubbing the silicon tetrafluoride-containing off-gas stream with water to form silica and fluosilicic acid of concentrations betwen about 20 percent and 28 percent by weight $H_2SiF_6$. Approximately half of the silica formed is easily filtered from the crude fluosilicic acid, and the balance of the silica in very finely divided or colloidal form remains suspended in the filtered acid. Water soluble impurities contained in the gas stream are, to a large extent, adsorbed in the scrubbing towers and contaminate the fluosilicic acid product. The fluosilicic acid solution may be treated with metal salts to form corresponding metal fluosilicates.

It has also been proposed to pass the fluorine-containing off-gases evolved during evaporation of phosphoric acid into aqueous solutions of ammonia or ammonium salts, whereby a solution of ammonium fluosilicate is formed and silica settles to the bottom of the adsorption apparatus. This method, as well as the fluosilicic acid method, requires a series of scrubbing towers or equivalent adsorptive apparatus, with the attendant solution handling problems. Both methods recover the fluorine in aqueous solution. The ammonium or metal fluosilicate solutions may be crystallized and the fluorine values ultimately recovered in a dry state. The necessary evaporation of course entails additional apparatus and expense. Furthermore, the undesirable impurities in the off-gas stream are retained in the ultimate aqueous fluorine-containing solution.

In accordance with the present invention, it is now possible to effect a dry recovery of the fluorine values in a silicon tetrafluoride-containing gas mixture.

It is, therefore, an object of this invention to provide an improved method for recovering fluorine values in the off-gases of the phosphate rock acidulation process. It is another object to provide a method of preparing ammonium fluosilicate and silica from silicon tetrafluoride-containing gases. Other objects and advantages of the present invention will be apparent to those skilled in the art from the following detailed description and the appended claims.

The process of the present invention comprises contacting silicon tetrafluoride in the presence of water vapor with gaseous ammonia at elevated temperatures to form a finely divided white powder comprising ammonium fluosilicate and silica. The reaction involved in the present invention proceeds according to the following equation:

$$3SiF_4 + 4NH_3 + 2H_2O \rightarrow SiO_2 + 2(NH_4)_2SiF_6$$

This reaction is carried out at temperatures above the condensation point of water in the reaction mixture and below about 300° C.

The present invention is particularly well suited to the recovery of fluorine values from the silicon tetrafluoride-containing off-gases of the phosphate rock acidulation process. The invention, however, is not limited to these off-gases, but is equally well adapted to the conversion of substantially pure silicon tetrafluoride to dry, solid ammonium fluosilicate and silica. The off-gases of many commercial phosphate rock acidulation processes are very dilute with respect to silicon tetrafluoride, being within the range of only about ½ to 2 percent by volume. These off-gases, which leave the acidulation apparatus at about 71° C., contain more than sufficient water vapor to satisfy the above equation. In the case of a dry silicon tetrafluoride starting material, sufficient water vapor must be added to the system to at least satisfy the equation. The present invention is particularly well adapted to the treatment of gases very dilute with respect to silicon tetrafluoride because its reaction with water vapor and ammonia is almost instantaneous.

The present process is carried out at temperatures above the condensation point of water in the gaseous reaction mixture and preferably below about 250° C. The lower practical temperature limit is governed by the fact that silicon tetrafluoride upon contact with liquid water in the presence of ammonia reacts to form siliceous deposits and soluble ammonium fluoride salts. Thus, the reaction involved in the present invention may be conducted at temperatures below the boiling point of water so long as condensation of water is avoided. The reaction illustrated by the above equation proceeds very nearly quantitatively up to about 250° C. with stoichiometric quantities of ammonia. At temperature above about 250° C. the reaction is considerably retarded. However, in the presence of excess ammonia the upper temperature limit is raised 25° to 50° C. The reaction is exothermic and this fact must be taken into consideration in choosing the temperature at which the reaction is to be conducted.

The product of the present invention is a dry, white powder analyzing approximately 86% $(NH_4)_2SiF_6$ and 14% $SiO_2$. The agglomerates generally are in the range of 1 to 5 microns. As observed by the electron microscope, the ultimate particles range from 50 to 500 millimicrons in diameter. The solid product is easily separated from the gaseous reactants by means of a bag or other equivalent filtering means.

The present invention is further illustrated in the following non-limiting examples.

Example I

The reaction between silicon tetrafluoride, water vapor and ammonia was examined at various temperatures between 100° C. and 250° C. A 30-inch glass tube 1-inch in diameter was provided with suitable stoppers at the intake and exit ends. The tube was fitted with two glass wool plugs so as to provide two adjacent small compartments of approximately equal length near the intake end. The remaining length of tube constituted the reaction zone. A similar glass wool plug was placed at the exit end of the tube adjacent the stopper to prevent loss of the product in the exit gas stream, which was directed through an exhaust pipe in the stopper. The intake stopper was adapted to pass three separate gas lines which terminated in jets for the introduction of moist air, silicon tetrafluoride, and an ammonia or an ammonia-air mixture into the reaction zone. Moist air saturated with water vapor at 75° C. was introduced into the first compartment, silicon tetrafluoride into the second compartment, and the ammonia or ammonia-air mixture introduced into the reaction zone. The above described compartmentation of the reaction tube provided an opportunity for mixing and preheating of the water vapor and silicon tetrafluoride prior to contact with ammonia to simulate conditions encountered in treating off-gases from phosphate rock acidulation. The reaction tube was also fitted with thermocouples at each end. A steam jacket was employed to maintain the reaction tube at 100° C. For higher temperatures, two tube furnaces were arranged adjacent the length of the reaction tube.

A series of eight 90-minute runs was conducted at various reaction temperatures with an excess of water vapor. Two runs were carried out with stoichiometric quantities of silicon tetrafluoride and ammonia, and the remaining runs conducted with varying degrees of excess ammonia. A visible reaction occurred readily, and with stoichiometric quantities of ammonia no excess appeared in the exit gases. At the ammonia jet a dense white cloud formed immediately which settled slowly throughout the length of the reaction zone. Upon continued operation with undiluted ammonia, a plug of solid product formed at the ammonia jet. Plugging was prevented and operation improved by diluting the ammonia stream with 1–3 parts of air per part of ammonia. The reaction appeared to be instantaneous at temperatures of from 100° C. to 250° C., and the product was completely retained in the reaction zone. Temperatures of 80° C. to 250° C. are exemplary of the range over which the present invention will generally be employed. At 350° C. there was no visible evidence of reaction in the reaction zone and the exit gases upon cooling fouled the exit gas collection system.

The following table sets out reaction conditions, weight and analysis of the product, as well as the mol ratio of ammonia to silica to fluorine in the solid product for this series of runs.

from runs 1 and 2, conducted with stoichiometric quantities of ammonia and silicon tetrafluoride, failed to reveal the presence of ammonia, which indicates quantitative recovery of ammonia in the product. The quantity of the product recovered in runs 6 and 8 was not sufficient to permit analysis thereof for ammonia, which accounts for the absence of these figures in the above table. Within experimental limits, the product of each run had a mole ratio of $NH_3:SiO_2:F$ of 4:3:12, as the equation indicates. X-ray defraction analysis of the powder product showed the same pattern of lines as did commercial ammonium fluosilicate, providing positive identification.

In order to test reaction efficiency and product purity with a source of crude silicon tetrafluoride, large scale apparatus was set up, and the off-gases of a commercial phosphate rock acidulation process were employed as the source of silicon tetrafluoride.

Example II

A 20 gallon drum was lagged with asbestos, partially filled with water, placed on a hot plate and used as a steam bath. A stoppered three quart bottle was suspended in the drum and served as the reaction vessel. Its stopper was adapted to pass two ⅜ in. pipes, the off-gas and ammonia feeds, as well as a ¼ in. exhaust pipe which was connected to a rotary pump. A bag filter packed with glass wool covered the exhaust pipe within the bottle to retain the product and to prevent clogging of the line.

The off-gases, leaving the acidulation apparatus at a temperature of about 160° F. contain on the average about ½–1 percent $SiF_4$, 3 percent $CO_2$ and 13 percent $H_2O$ by volume, as well as air and small quantities of impurities and rock dust. The dew point of these gases was 52° C. The dust was removed by passing the gas through a cleanout tower maintained above 52° C. A pipe from the cleanout tower to the reaction vessel was jacketed to maintain the temperature of the gas above its dew point at all times. Ammonia was metered through the second feed pipe at a rate sufficient to maintain an excess of ammonia in the reaction vessel at all times.

The off-gases and ammonia were drawn into the reaction vessel by means of the rotary pump at a rate of approximately 1 cubic foot per minute. The reaction vessel was maintained at a temperature of at least 100° C. by steam generated in the drum.

The white finely divided product $(SiO_2+2(NH_4)_2SiF_6)$ was collected at the exhaust pipe filter and the bottom of the reaction vessel. Five hours of continuous operation produce 417 grams of product which had an apparent density of 0.288 g./cc. and analyzed:

| | Percent |
|---|---|
| $SiO_2$ | 38.38 |
| F | 49.75 |
| $NH_3$ | 15.60 |
| Ca | 0.011 |

| Run No. | Reaction Conditions ||||||||| Product |||||
|---|---|---|---|---|---|---|---|---|---|---|---|---|---|---|
| | Av. Flow Rates (cc./min. @ 25° C.) |||| Percent vol. $SiF_4$ | Av. Mole Ratio, $NH_3:SiF_4:H_2O$ | Temp., ° C. | Wt., g. | Percent $SiO_2$ | Percent $NH_3$ | Percent F | Mole Ratio, $NH_3:SiO_2:F$ |
| | Air | Steam | $SiF_4$ | $NH_3$+air | Total | | | | | | | | |
| 1 | 534 | 403 | 19.9 | 27.5+0 | 984 | 2.0 | 1.38:1:20.2 | 100 | 11.4 | 39.89 | 15.44 | 50.20 | 4.10:3:11.91 |
| 2 | 491 | 265 | 19.2 | 28.3+65 | 868 | 2.2 | 1.47:1:13.8 | 100 | 10.6 | 37.78 | 15.56 | 50.75 | 4.38:3:12.72 |
| 3 | 493 | 302 | 12.1 | 37+0 | 844 | 1.4 | 3.05:1:25 | 100 | 7.5 | 39.49 | 15.56 | 50.20 | 4.17:3:12.03 |
| 4 | 505 | 255 | 26.3 | 119+130 | 1,035 | 2.5 | 4.53:1:9.7 | 150 | 14.4 | 38.26 | 15.75 | 51.00 | 4.35:3:12.63 |
| 5 | 491 | 348 | 19.7 | 109+123 | 1,091 | 1.8 | 5.53:1:17.7 | 180 | 16.8 | 38.95 | 15.80 | 50.25 | 4.29:3:12.21 |
| 6 | 490 | 336 | 6.6 | 131+120 | 1,084 | 0.61 | 19.9:1:50.8 | 200 | 4 | 41.33 | | 51.00 | :3:11.73 |
| 7 | 500 | 336 | 8.12 | 107+114 | 1,065 | 0.76 | 13.2:1:41 | 225 | 6.6 | 42.00 | 15.81 | 51.50 | 3.99:3:11.61 |
| 8 | 488 | 336 | 6.9 | 115+120 | 1,066 | 0.65 | 16.6:1:48 | 250 | 5.3 | 40.32 | | 50.60 | :3:11.88 |

A sample of the dry finely divided white powder prepared at 100° C. was leached with water and found to contain 14.2% $SiO_2$ by weight which agrees favorably with a silica content of 14.4% calculated for the mixture $SiO_2+2(NH_4)_2SiF_6$. An analysis of the exhaust gases

| | Percent |
|---|---|
| $Fe_2O_3$ | 0.01 |
| $CO_2$ | 0.03 |
| $P_2O_5$ | 0.00 |

The mole ratio of $NH_3:SiO_2:F$ in the product was 4.31:3:12.41.

The present invention thus provides a particularly efficient method for recovering fluorine values from the off-gases of the phosphate rock acidulation process. The invention also provides an equally efficient method for the conversion of silicon tetrafluoride to a dry very finely divided mixture of ammonium fluosilicate and silica. The advantages of the present dry process over the methods of the prior art are manifest from the nature of gas phase reactions generally and the obvious apparatus and circulation limitations of any liquid-gas adsorption process.

The silica impurity, equal to approximately 14% by weight, will not in most instances be a deterrent to use of the product in processes heretofore employing pure ammonium fluosilicate. For example, because of the very dilute concentrations employed, silica will not cause turbidity or adversely affect the clothes being treated when the material is used as a laundry sour. The product may also be used in the magnesium casting art, where ammonium fluosilicate is added to the sand molds to prevent oxidation and scaling of the casting.

On the other hand, the product may be leached with water to remove silica and the resulting aqueous ammonium fluosilicate solution concentrated for use or pure ammonium fluosilicate crystallized therefrom. Alternatively, ammonia may be added to an aqueous solution of ammonium fluosilicate to a pH of about 8–9, silica filtered from the solution, and substantially pure ammonium fluoride recovered. The thus formed silica is exceedingly finely divided and has a number of obvious uses.

The product is also an excellent source of cheap substantially pure silicon tetrafluoride. This compound may be recovered by treating the product with concentrated sulfuric acid. Silicon tetrafluoride is evolved while ammonium sulfate and ammonium acid sulphate remains dissolved in the sulfuric acid solution. The resulting sulfuric acid may be employed in the acidulation of phosphate rock, thus utilizing the dissolved ammonium salts as a source of nitrogen in the superphosphate formed.

The present invention also provides a vapor phase process for the preparation of primary amine fluosilicates. The amine is substituted for ammonia in the reaction and the solid product contains one mole of silica and two moles of amine fluosilicate. Separation may be effected by water leaching as in the case of the silica-ammonium fluosilicate product. Isopropylamine and butylamine are particularly reactive.

I claim:

1. A process for preparing a dry mixture of ammonium fluosilicate and silica which comprises admixing silicon tetrafluoride with at least two-thirds mole of water vapor and at least four-thirds moles of gaseous ammonia per mole of silicon tetrafluoride at temperatures above the condensation point of water in the gaseous mixture and below about 300° C., thereby forming a dry mixture of finely divided ammonium fluosilicate and silica in an atmosphere free of liquid water and separating said dry mixture from said atmosphere above the condensation point of water.

2. A process for preparing a dry, finely divided mixture of ammonium fluosilicate and silica which comprises admixing silicon tetrafluoride with at least two-thirds mole of water vapor per mole and at least 1.33 moles of gaseous ammonia per mole of silicon tetrafluoride reacting at temperatures between about 80° C. and 250° C., and separating the finely divided mixed product from the gaseous reactants above the condensation point of water.

3. An improved process for recovering fluorine values in substantially pure form from a gas mixture containing impure silicon tetrafluoride and water vapor in a ratio of at least two-thirds mole of water vapor per mole of silicon tetrafluoride, which comprises adding to said gas mixture at least 1.33 moles of gaseous ammonia per mole of silicon tetrafluoride at temperatures above the condensation point of water in the gaseous reaction mixture and below about 250° C., thereby forming a dry, finely divided mixture of ammonium fluosilicate and silica, filtering said finely divided mixture from the gaseous at a temperature above the condensation point of water, and water leaching said mixture to form a solution of ammonium fluosilicate substantially free of silica and the contaminants of the silicon tetrafluoride-containing gas mixture.

4. A process for preparing a dry, finely divided mixture of ammonium fluosilicate and silica which comprises admixing silicon tetrafluoride-containing gas containing at least two-thirds mole of water vapor per mole of silicon tetrafluoride with at least four-thirds moles of gaseous ammonia per mole of silicon tetrafluoride at a temperature above the condensation point of water vapor and below about 250° C., and filtering the resulting finely divided mixture of ammonium fluosilicate and silica from the gaseous reactants above the condensation point of water.

5. A process for preparing a dry, finely divided mixture of ammonium fluosilicate and silica which comprises admixing off-gases of the phosphate rock acidulation process containing silicon tetrafluoride and at least two-thirds mole of water vapor per mole of silicon tetrafluoride with at least four-thirds moles of gaseous ammonia per mole of silicon tetrafluoride at temperatures above the condensation point of water in the gaseous reaction mixture and below about 250° C., and filtering the finely divided ammonium fluosilicate and silica product from the gaseous reactants above the condensation point of water.

6. A process for obtaining substantially pure silicon tetrafluoride from off-gases of the phosphate rock acidulation process containing silicon tetrafluoride and at least two-thirds mole of water vapor per mole of silicon tetrafluoride, which comprises filtering said off-gases to remove entrained solids, admixing said filtered off-gases with at least 1.33 moles of gaseous ammonia per mole of silicon tetrafluoride at a temperature above the condensation point of water in the gaseous reaction mixture and below about 300° C., thereby forming ammonium fluosilicate and silica in admixture as dry solids, filtering said finely divided mixture of ammonium fluosilicate and silica, substantially free of the impurities of said off-gases, from the gaseous reactants, introducing said solid mixture into concentrated sulfuric acid and collecting the substantially pure silicon tetrafluoride evolved.

7. A process for recovering fluorine values from a gaseous mixture containing silicon tetrafluoride comprising adding to said mixture at least two-thirds mole of water vapor and four-thirds moles of ammonia per mole of silicon tetrafluoride, thereby inducing the formation of ammonium fluosilicate and silica in admixture as a finely divided solid and filtering said admixture of ammonium fluosilicate and silica from said gaseous mixture, said formation reaction and recovery being carried out at a temperature above the condensation point of water in the system and below about 300° C.

8. A process for forming ammonium fluosilicate comprising adding to a silicon tetrafluoride-containing gas at least two-thirds mole of water vapor and four-thirds moles of gaseous ammonia per mole of silicon tetrafluoride, maintaining the temperature of the resulting reaction mixture above the condensation point thereof but below about 300° C., thereby forming silica and ammonium fluosilicate as a mixture of dry, finely divided solids, and filtering said finely divided solids from said reaction mixture at a temperature above the condensation point of the system.

References Cited in the file of this patent

UNITED STATES PATENTS

| | | |
|---|---|---|
| 1,235,552 | Chappell | Aug. 7, 1917 |
| 1,859,998 | Svendsen | May 24, 1932 |
| 1,911,004 | Svendsen | May 23, 1933 |
| 2,447,359 | Oakley | Aug. 17, 1948 |

Notice of Adverse Decision in Interference

In Interference No. 89,611 involving Patent No. 2,785,953, F. T. Fitch, Process for preparing a dry mixture of ammonium fluosilicate and silica, final decision adverse to the patentee was rendered Nov. 28, 1962, as to claim 1.

[*Official Gazette April 30, 1963.*]